US009104757B2

(12) United States Patent  
Benari et al.

(10) Patent No.: US 9,104,757 B2  
(45) Date of Patent: Aug. 11, 2015

(54) INTERACTIVE SEARCH MONITORING IN A VIRTUAL MACHINE ENVIRONMENT

(75) Inventors: Amos Benari, Yokneam Hamoshava (IL); Vitaly Elyashev, Ramae Can (IL)

(73) Assignee: Red Hat Israel, Ltd., Raanana (IL)

( * ) Notice: Subject to any disclaimer, the term of this patent is extended or adjusted under 35 U.S.C. 154(b) by 822 days.

(21) Appl. No.: 12/490,710

(22) Filed: Jun. 24, 2009

(65) Prior Publication Data

US 2010/0332489 A1     Dec. 30, 2010

(51) Int. Cl.
G06F 7/00       (2006.01)
G06F 17/30      (2006.01)

(52) U.S. Cl.
CPC .... G06F 17/30864 (2013.01); G06F 17/30696 (2013.01)

(58) Field of Classification Search
CPC .......... G06F 19/3487; G06F 17/30864; G06F 17/30867; G06F 17/30699; Y10S 707/99933; Y10S 707/99935; Y10S 707/99934
USPC ................................................. 707/695, 690
See application file for complete search history.

(56) References Cited

U.S. PATENT DOCUMENTS

| 4,253,145 A | | 2/1981 | Goldberg |
| 4,949,254 A | | 8/1990 | Shorter |
| 5,898,836 A | * | 4/1999 | Freivald et al. ............... 709/218 |
| 5,913,065 A | | 6/1999 | Faustini |
| 6,009,271 A | * | 12/1999 | Whatley ........................ 717/127 |
| 6,766,315 B1 | * | 7/2004 | Bratsos et al. ........................ 1/1 |
| 7,020,750 B2 | * | 3/2006 | Thiyagaranjan et al. ..... 711/141 |
| 7,117,241 B2 | | 10/2006 | Bloch et al. |
| 7,401,064 B1 | | 7/2008 | Arone |
| 7,409,379 B1 | * | 8/2008 | Katzer ................................. 1/1 |
| 2002/0073063 A1 | | 6/2002 | Faraj |
| 2002/0107835 A1 | * | 8/2002 | Coram et al. ..................... 707/1 |
| 2004/0046787 A1 | * | 3/2004 | Henry et al. .................. 345/744 |
| 2004/0267900 A1 | * | 12/2004 | Hoekstra et al. ............. 709/217 |
| 2005/0102297 A1 | | 5/2005 | Lloyd et al. |
| 2005/0216421 A1 | * | 9/2005 | Barry et al. ..................... 705/64 |
| 2006/0059253 A1 | * | 3/2006 | Goodman et al. ............ 709/223 |
| 2007/0088762 A1 | | 4/2007 | Harris et al. |
| 2007/0179955 A1 | | 8/2007 | Croft et al. |
| 2007/0300220 A1 | | 12/2007 | Seliger et al. |

(Continued)

OTHER PUBLICATIONS

The TimesTen Team, "Mid-Tier Caching: The TimesTen Approach" Jun. 4-6, 2002, ACM SIGMOD, p. 588-593.*

(Continued)

*Primary Examiner* — Mariela Reyes  
*Assistant Examiner* — Linh Black  
(74) *Attorney, Agent, or Firm* — Lowenstein Sandler LLP (57) ABSTRACT

A method and system for providing up-to-date monitoring results in a virtual machine environment are described. In one embodiment, a control server executes a query pertaining to one or more objects in a virtual machine system, and provides a result of the query to a client for presentation to a user in a graphical user interface (GUI). The control server then periodically re-executes the query to obtain up-to-date information for the objects in the virtual machine system. Upon each re-execution of the query, the control server compares a new result of the query with a previous result of the query to determine whether the up-to-date information for the objects in the virtual machine system has changed. If so, the control server provides the new result of the query to the client. If not, the control server refrains from providing the new result of the query to the client.

18 Claims, 5 Drawing Sheets

(56) References Cited

U.S. PATENT DOCUMENTS

2008/0016056 A1* 1/2008 Malloy et al. ............... 707/5
2008/0086464 A1   4/2008 Enga
2008/0270354 A1  10/2008 Weissman
2009/0013321 A1   1/2009 Mattiocco et al.
2009/0094200 A1*  4/2009 Baeza-Yates et al. ......... 707/3
2009/0210427 A1*  8/2009 Eidler et al. ................ 707/10
2010/0223309 A1   9/2010 Benari et al.

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.
Red Hat Office Action for U.S. Appl. No. 12/395,413, mailed Feb. 3, 2011.
Red Hat Office Action for U.S. Appl. No. 12/395,413, mailed Jul. 27, 2011.
Vmware; Vmware Infrastructure Architecture Overview; 2006; pp. 1-13.
USPTO, Advisory Action for U.S. Appl. No. 12/395,413 mailed Nov. 8, 2011.
USPTO, Final Office Action for U.S. Appl. No. 12/395,413 mailed Feb. 23, 2012.
USPTO, Advisory Action for U.S. Appl. No. 12/395,413 mailed May 17, 2012.
USPTO, Office Action for U.S. Appl. No. 12/395,413 mailed on Jun. 6, 2012.
USPTO, Office Action for U.S. Appl. No. 12/395,413 mailed Sep. 14, 2012.
USPTO, Advisory Action for U.S. Appl. No. 12/395,413 mailed Nov. 28, 2012.
USPTO, Office Action for U.S. Appl. No. 12/395,413 mailed Oct. 31, 2013.
USPTO, Final Office Action for U.S. Appl. No. 12/395,413 mailed Jun. 18, 2014.
USPTO, Advisory Action for U.S. Appl. No. 12/395,413 mailed Oct. 28, 2014.

* cited by examiner

INTERACTIVE SEARCH MONITORING IN A VIRTUAL MACHINE ENVIRONMENT

TECHNICAL FIELD

Embodiments of the present invention relate to management of virtual machines, and more specifically, to providing up-to-date monitoring results in a virtual machine environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

The virtualization technologies have wide applications in the computer field with the development of computer systems. For example, such virtualization technologies can be used to implement a virtual desktop application which runs within a virtual machine of a host and accessed from a client over a network.

In a large organization, thousands of virtual machines can be run on one or more hosts, making it very difficult for a system administrator to manage the virtual machines. One existing solution employs a host controller that monitors the operation of the virtual machines and allows an IT administrator to add a new virtual machine, delete an existing virtual machine, migrate a virtual machine to a different host, or perform any other action based on up-to-date information provided by the host controller. The up-to-date information for the virtual machine system can be displayed to a user (e.g., an IT administrator) on the user's client machine via a graphical user interface (GUI). Usually, the information in the GUI is updated in response to frequent requests sent from the client to the host controller. However, this approach creates network-related problems in a system with a limited bandwidth such as a virtual desktop system or the like.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for providing up-to-date monitoring results in a virtual machine environment are described. In one embodiment, a control server executes a query pertaining to one or more objects in a virtual machine system, and provides a result of the query to a client for presentation to a user in a graphical user interface (GUI). The virtual machine system may include one or more host servers, each hosting one or more virtual machines, and multiple clients coupled to the host servers via a network. The control server is coupled to the host servers to manage the virtual machines. The above objects may include a virtual machine, a host server, a virtual machine base image, etc.

The control server periodically re-executes the query to obtain up-to-date information for the relevant object(s) in the virtual machine system. Upon each re-execution of the query, the control server compares a new result of the query with a previous result of the query to determine whether the up-to-date information for the object(s) has changed. If so, the control server provides the new result of the query to the client. If not, the control server refrains from providing the new result of the query to the client.

Embodiments of the present invention significantly reduce the amount of data transferred between the control server and the clients, thus improving bandwidth capacity and the overall performance of the virtual machine system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "de-allocating", "linking", "modifying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
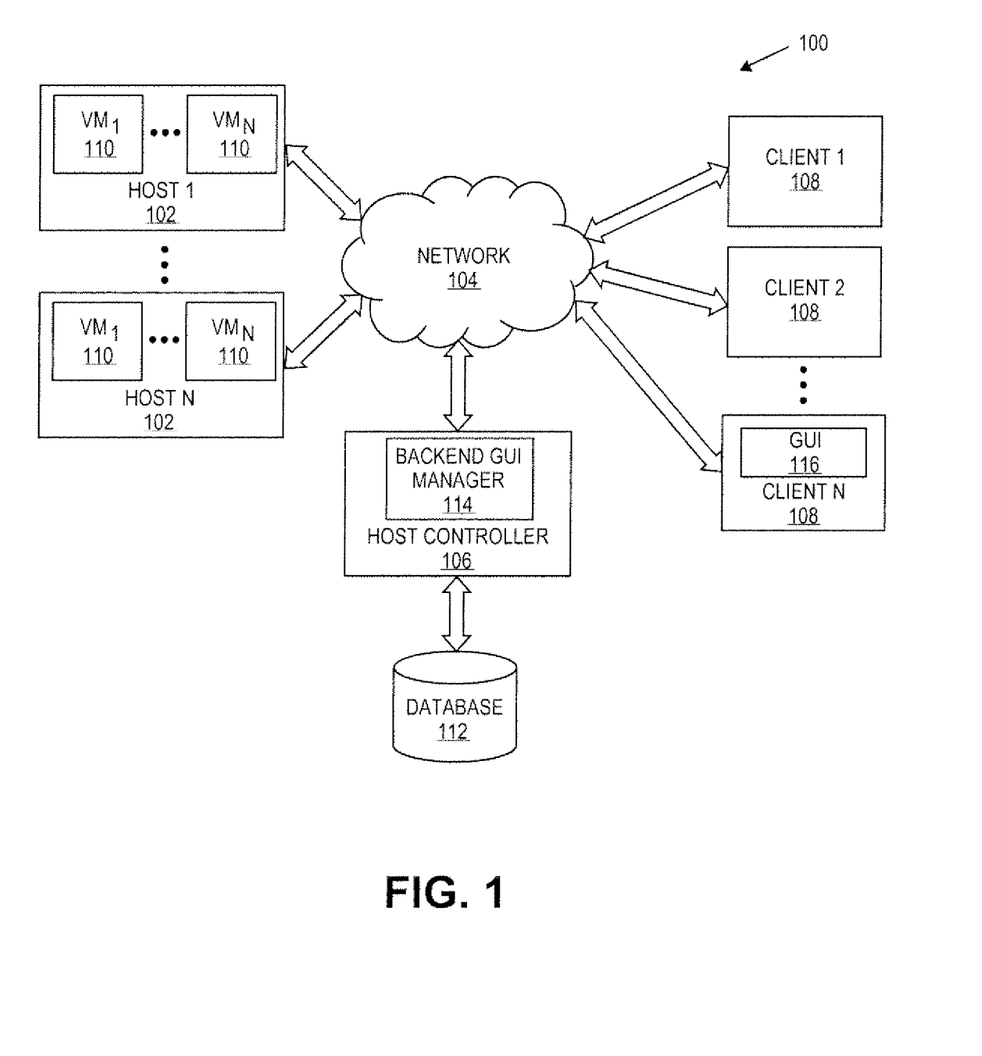
FIG. 1 illustrates an exemplary network architecture in which embodiments of the present invention may operate.

FIG. 1 illustrates an exemplary network architecture 100 in which embodiments of the present invention may operate. The network architecture 100 may include one or more host servers 102 coupled to clients 108 over a network 104. The network 104 may be a private network (e.g., a local area network (LAN), wide area network (WAN), intranet, etc.) or a public network (e.g., the Internet). The hosts 102 may be coupled to a host controller (also referred to as a host server) 106 via the network 104. In addition, the host controller 106 is coupled to the clients 108 via the network 104. Alternatively, the host controller 106 may be part of one of the hosts 102.

In one embodiment, the clients 108 may include computing devices that have a wide range of processing capabilities. Some or all of the clients 108 may be thin clients, which serve as access terminals for users and depend primarily on the host 102 for processing activities. For example, client 108 may be a desktop computer, laptop computer, cellular phone, personal digital assistant (PDA), etc. The clients 108 may run client applications such as a Web browser (not shown) and a graphic user interface (GUI) 116. The clients 108 may also run other client applications to receive multimedia data streams or other data sent from the hosts 102 and re-direct the received data to a display or other user interface.

Each host 102 runs one or more virtual machines 110 that have guest operating systems (OSes) that may be different from one another. The guest OS may include Microsoft Windows, Linux, Solaris, Mac OS, etc. The host 102 may include a hypervisor (not shown) that emulates the underlying hardware platform for the virtual machines 110. The hypervisor may also be known as a virtual machine monitor (VMM), a kernel-based hypervisor or a host operating system.

Each virtual machine 110 can be accessed by one or more of the clients 108 over the network 104. In one scenario, virtual machine 110 can provide a virtual desktop for client 108. A virtual desktop can represent an output (e.g., an image to be displayed) generated by a desktop application running within VM 110. Graphics data associated with the virtual desktop can be captured and transmitted to client 108 (e.g., in the form of commands), where the virtual desktop may be rendered and presented to the user. In one embodiment, the host 102 communicates with the client 108 using a remote access protocol (e.g., Remote Desktop Protocol (RDP), Simple Protocol for Independent Computing Environments (SPICE™ from Red Hat, etc.).

The virtual machines 110 are managed by the host controller 106. In particular, the host controller 106 may add a virtual machine, delete a virtual machine, balance the load on the server cluster, provide directory service to the virtual machines 110, etc. In addition, the host controller 106 monitors the operation of the system 100 and stores information about different objects of the system 100 in a database 112. The objects may include, for example, host servers 102, virtual machines 110, guest operating systems, virtual desktops or other applications of the virtual machines 110, base images of virtual machines 110 (initial images used to create new virtual machines), users, etc. The host controller 106 can search the database 112 to find information about any object in the system 100, and manage or operate on it.

In one embodiment, some or all of the clients 108 provide a GUI 116 for their users (e.g., a system administrator, an IT administrator, an end user, etc.). Depending on the user's access privileges, the GUI 116 may present up-to-date information about the operation of the entire system 100, portions of the system 100 (e.g., a portion associated with a specific geographic location or a specific subsidiary of a company), or certain objects within the system 100 (e.g., a specific virtual machine or virtual desktop). The GUI 116 may be an independent application installed on the client 108 or part of another application (e.g., web browser) running on the client 108. In one embodiment, the GUI 116 may allow a user to request the up-to-date information using a query (e.g., a query selected from a list of predefined queries and/or user-specified queries). The client 108 sends a query request to the host controller 106, which then provides a query result to the client 108 for presentation to the user in the GUI 116. In a system with a large number of virtual machines or virtual desktops, a user such as a system administrator may need to see any changes that occur in the system and provide immediate assistance if needed. Hence, the information presented in the GUI 116 should be constantly refreshed to reflect changes occurring in the system 100.

In one embodiment, the host controller 106 includes a backend GUI manager 114 that provides new query results to the client 108. In particular, the backend GUI manager 114 receives query requests from clients 108, executes the relevant queries, and sends the query results to corresponding clients 108. The backend GUI manager 114 then repeatedly re-executes the query to retrieve current data from the database 112. If the new query result differs from the previous query result, the backend manager 114 provides the new query result to a relevant client 108. Otherwise, the backend manager 114 refrains from sending the new query result to the client 108.

Figure 2:
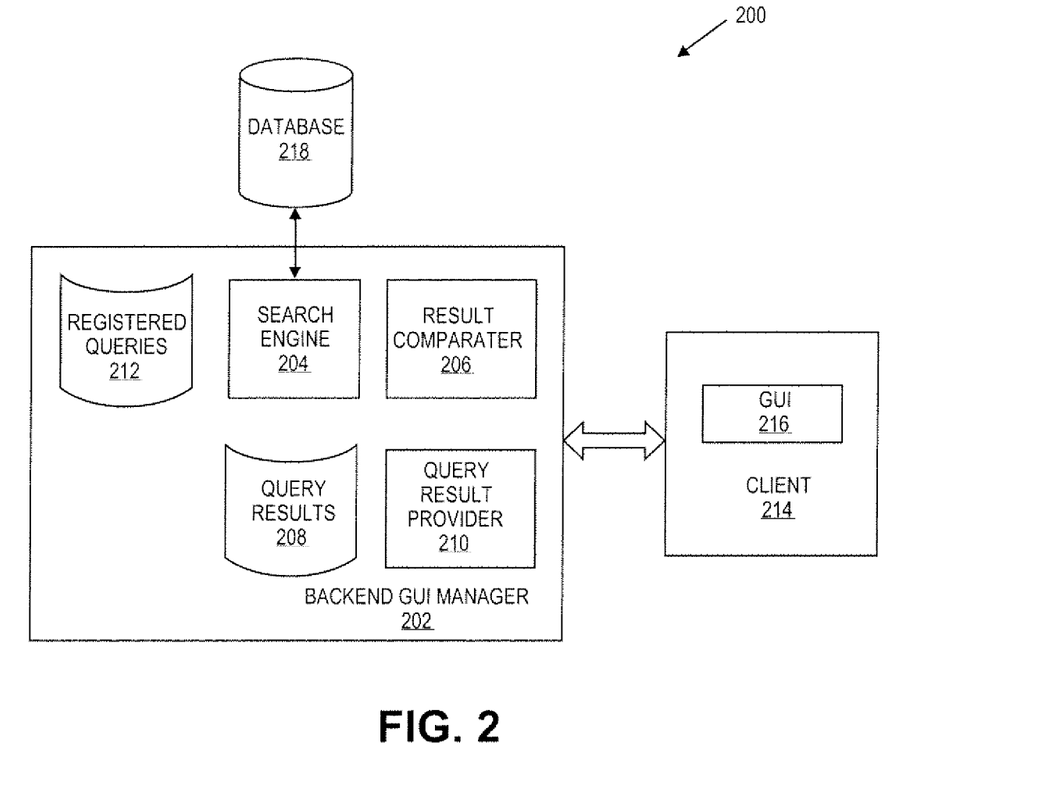
FIG. 2 is a block diagram illustrating one embodiment of a system for providing real-time monitoring results in a virtual machine environment.

FIG. 2 is a block diagram of one embodiment of a system 200 for providing real-time monitoring results in a virtual machine environment. The system 200 may include a backend GUI manager 202 hosted by a control server and a GUI 216 hosted by a client 214. An exemplary GUI 216 will be discussed in more detail below in conjunction with FIG. 3.

Referring to FIG. 2, the GUI 216 allows a user (e.g., a system administrator) to specify queries that should provide up-to-date results on specific objects of the virtual machine system. These objects can be, for example, host servers, virtual machines, guest operating systems, virtual desktops or other applications of the virtual machines, base images of virtual machines, users, etc. For example, a query may require to show all desktops that are running on a host that has a CPU usage greater than 90 percent. That is, out of many virtual machines that IT may have in the virtual machine system, the system administrator can quickly locate desktops running on a host with the above characteristics, and live-migrate these desktops from the host or log into the console of that machine and fix any issues that may exist.

In order to allow a system administrator to act quickly on various problems or changes that may take place in the virtual machine system, the information provided to the system administrator in the GUI 216 has to be frequently refreshed. In one embodiment, the GUI 216 allows a user to register queries that should be periodically re-executed by the backend GUI manager 202. These queries may be entered by a user or predefined. A list of registered queries may be passed to the backend GUI manager 202 that stores them in a data store (e.g., a table, a file, etc.) 212.

In one embodiment, a user may also specify what change in a query result should cause a refresh of data in the GUI 216 and what change in the query result should be ignored. For example, CPU usage or memory usage of a host may change too frequently and may not be worth reporting unless they reach a certain threshold. Conversely, a change in the state of a virtual machine (e.g., up, down, crashed, etc.) may need to be reported because a system administrator may have to act on it right away.

The backend GUI manager 202 is responsible for providing initial and updated query results to the GUI 216. In one embodiment, the backend GUI manager 202 includes a search engine 204, a result comparator 206, and a query result provider 210. Upon receiving a request to run a query from the GUI 216, the search engine 204 retrieves the query from the data store 212 and runs the query against the database 218. The query result provider 210 then communicates the query result to the GUI 216.

Next, if the query is intended to be re-executed periodically, the query result is stored in a data store (e.g., a buffer, a temporary file, etc.) 208. The search engine 204 re-executes the query at predefined time intervals (e.g., every 2 seconds). After each re-execution of the query, the result comparator 206 compares the new query result with the previous query result in data store 208. If the two results are the same, the new query result is ignored. If the two results are different, the query result provider 210 notifies the GUI 216 about the change, provides the new query result to the GUI 216, and stores the new query result in the data store 208.

In one embodiment, before notifying the GUI 216 about the change, the query result provider 210 determines whether the change satisfies a reporting requirement (e.g., whether the change is of the type that was intended to cause a reporting event). If not, the new result is ignored. If so, the new result is provided to the GUI 216 and is also stored in the data store 208 for the comparison with the next query result.

In one embodiment, rather than sending the entire new result to the GUI 216, the query result provider 210 extracts the difference between the previous query result and the new query result, and sends only this difference to the GUI 216, thus reducing the amount of data being transmitted from the control server to the client.

Figure 3:
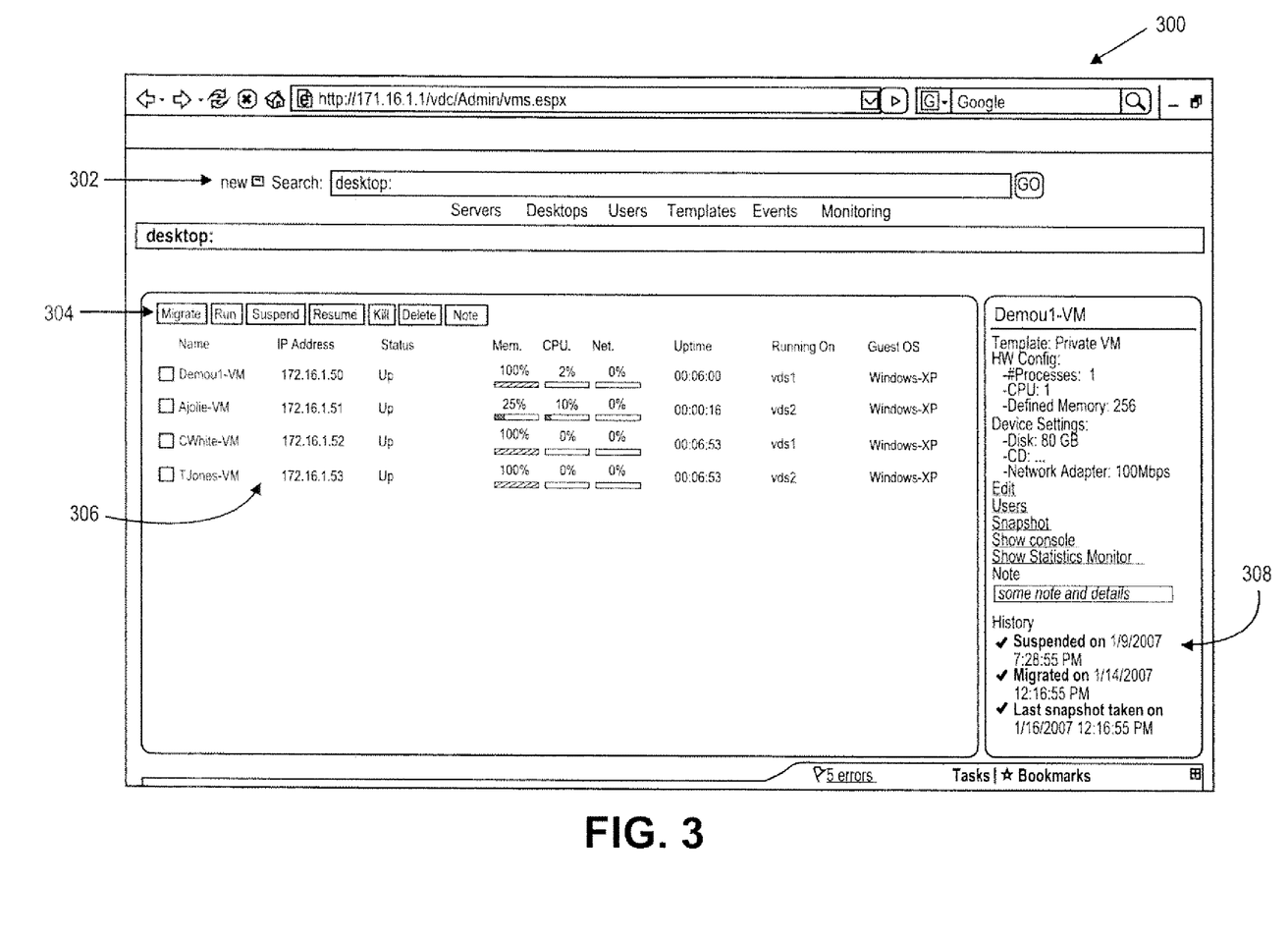
FIG. 3 illustrates an exemplary graphical user interface presenting real-time monitoring results pertaining to various objects in a virtual machine system, in accordance with one embodiment of the present invention.

FIG. 3 illustrates an exemplary GUI 300 presenting real-time monitoring results pertaining to various objects in a virtual machine system, in accordance with one embodiment of the present invention. GUI 300 includes a search bar 302 that allows a user to start a new query pertaining to an object (e.g., server, desktop, user or template) or an event (e.g., CPU usage of a host exceeds 90 percent).

GUI 300 also includes area 306 that presents results of the query. Content of the area 306 is updated every time the result of the query changes. Depending on the change, the user can request an action 304 such as migrate, run, suspend, resume, kill or delete.

GUI 300 further includes area 308 that presents detailed information on an object selected from the list displayed in the area 306. In the illustrated example, area 308 includes details on the first desktop (Demou1-VM).

Figure 4:
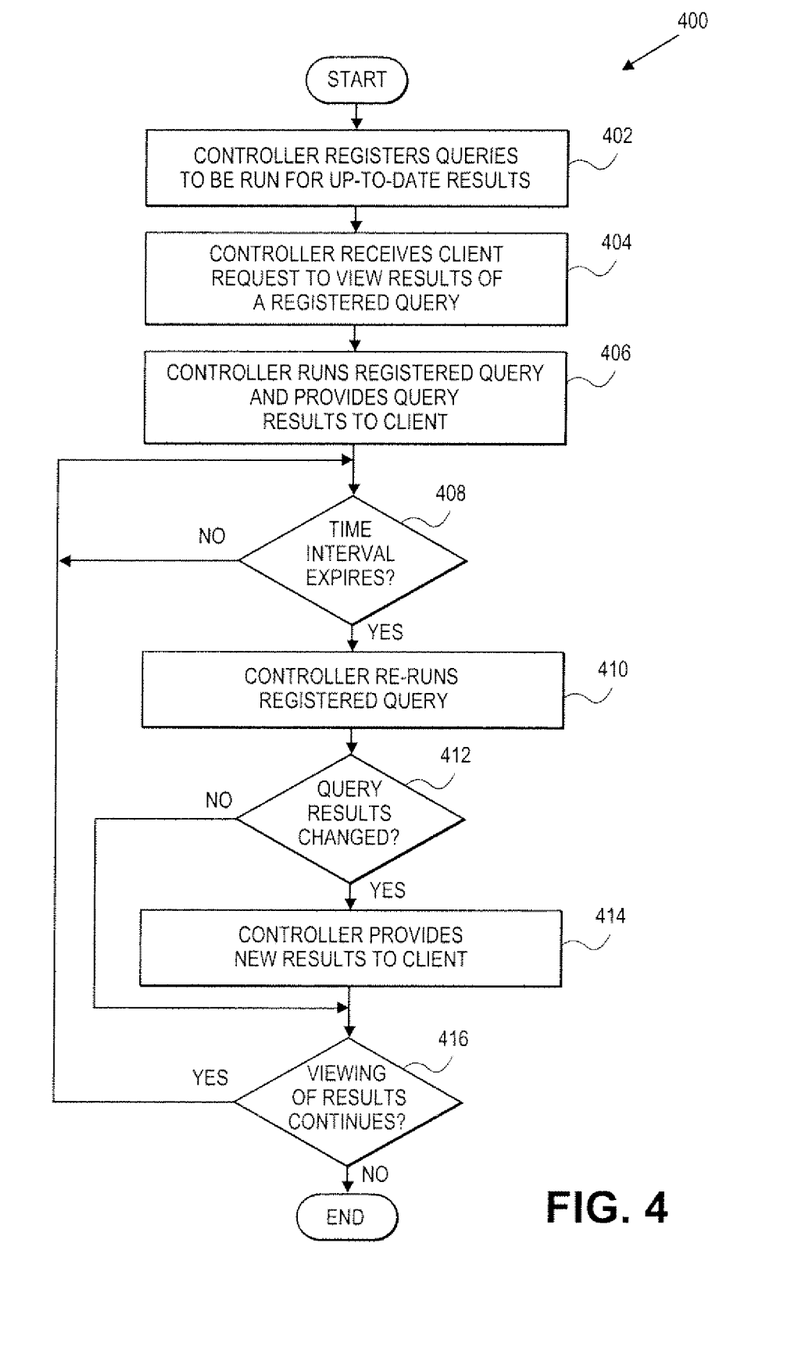
FIG. 4 is a flow diagram illustrating a method for providing real-time monitoring results in a virtual machine environment, in accordance with one embodiment of the present invention.

FIG. 4 is a flow diagram illustrating a method 400 for providing real-time monitoring results in a virtual machine environment, in accordance with one embodiment of the present invention. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by a host controller (or control server) 106 of FIG. 1.

Referring to FIG. 4, the method 400 begins with the host controller registering queries to be run for up-to-date results (block 402). The queries may be specified by a user or selected from a list of predefined queries via a GUI hosted by a client. A query may be associated with an indicator specifying whether the query should be periodically (e.g., every 2 seconds) re-executed. In one embodiment, the query is also associated with data specifying what changes in the query result should generate a reporting event (e.g., an event that causes a new query result to be sent from the host controller to the GUI on the client).

At block 404, the host controller receives a client request to view results of a query. The client request may include data identifying the requested query (e.g., query ID). At block 406, the host controller runs the request query and provides the query result to the client. In addition, the host controller stores the query result at a designated data store (e.g., a buffer).

At block 408, the host controller waits until it is time to re-run the query, and then at block 410, re-executes the query. At block 412, the host controller determines whether the new query result differs from the previous query result. If not, the host controller ignores the new query result and returns to block 408. If so, the host controller provides the new query result to the client, and replaces the previous query result with the new query result in the designated data store (block 414). In one embodiment, prior to performing block 414, the host controller determines whether the change in the new query result should trigger a reporting event, and performs block 414 only if this determination is positive.

At block 416, the host controller determines whether the user is still viewing the query result (e.g., if a relevant GUI window is still open). If so, method 400 returns to block 408. Otherwise, method 400 ends.

Figure 5:
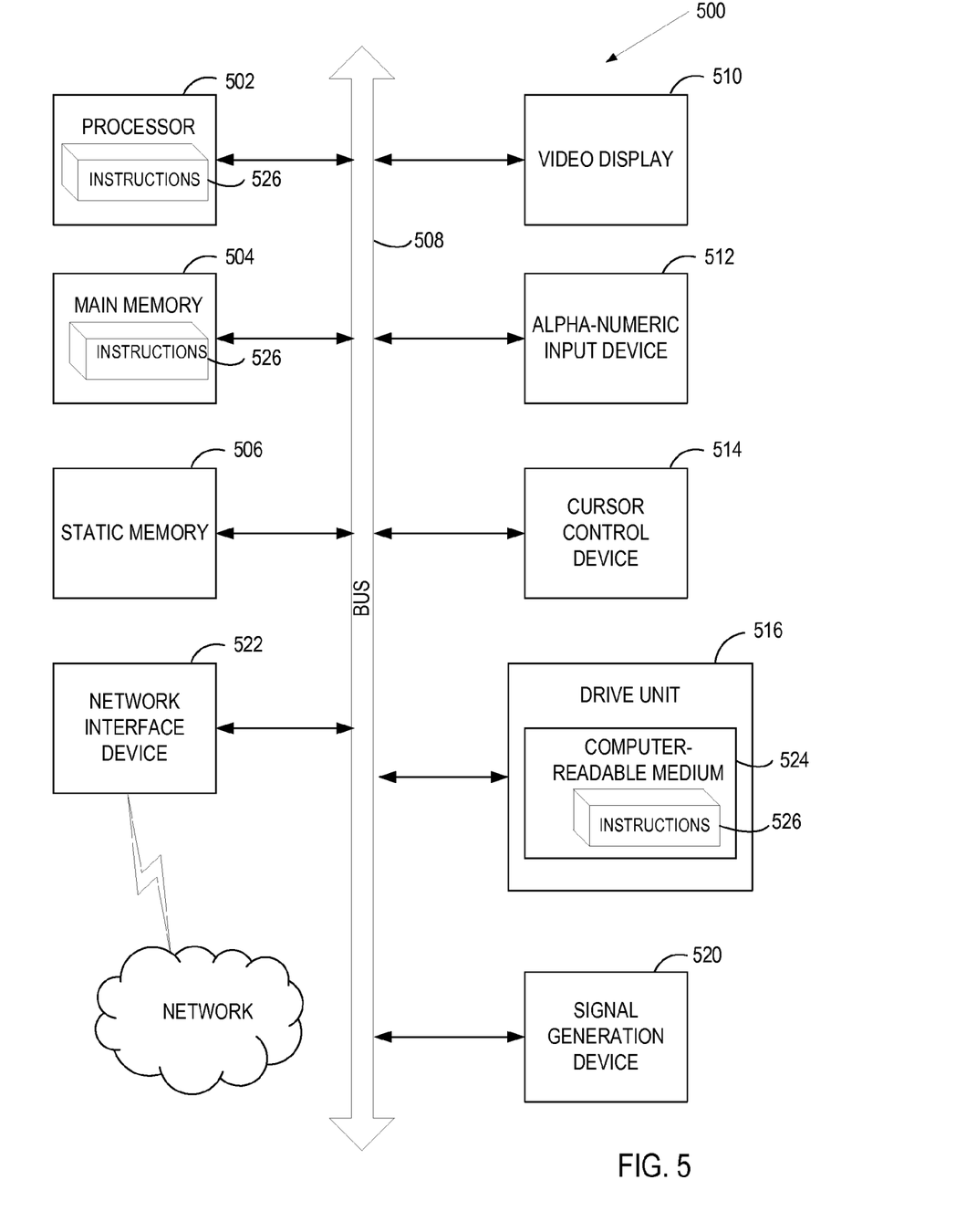
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., processing logic 526) embodying any one or more of the methodologies or functions described herein. The processing logic 526 may also reside, completely or at least partially, within the main memory 504 and/or within the processing device 502 during execution thereof by the computer system 500, the main memory 504 and the processing device 502 also constituting machine-readable storage media. The processing logic 526 may further be transmitted or received over a network via the network interface device 522.

The machine-readable storage medium 524 may also be used to store the swap memory manager 132 of FIG. 1. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
    executing, by a host controller server, a query pertaining to at least one virtual machine of a plurality of virtual machines running on a plurality of host computers in a virtual machine system, a query being associated with reporting event data concerning the at least one virtual machine, the virtual machine system comprising the host controller server coupled to the plurality of host computers via a network;
    providing, by the host controller server, a result of the query to a client of a plurality of clients via the network for presentation to a user in a graphical user interface (GUI);
    periodically re-executing, by the host controller server, the query to obtain up-to-date information for the at least one virtual machine in the virtual machine system;
    upon each re-execution of the query, comparing, by a processing device of the host controller server, a new result of the query with a previous result of the query to determine whether the up-to-date information for the at least one virtual machine in the virtual machine system has changed, wherein the virtual machine system comprises the plurality of clients coupled to the plurality of host computers and the host controller server via the network;
    if the up-to-date information for the at least one virtual machine in the virtual machine system has changed, determining, based on the reporting event data, whether a change in the up-to-date information corresponds to a type of change intended to generate a reporting event;
    providing, by the host controller server, the new result of the query to the client via the network for presentation to the user in the GUI if the up-to-date information for the at least one virtual machine in the virtual machine system has changed and the change in the up-to-date information corresponds to the type of change intended to generate a reporting event; and refraining from providing the new result of the query to the client if the up-to-date information for the at least one virtual machine in the virtual machine system has not changed or the change in the up-to-date information does not correspond to the type of change intended to generate a reporting event.

2. The method of claim 1, wherein the query pertaining the at least one virtual machine is a query about any one of a virtual machine, a host computer executing the virtual machine, a virtual machine user, a virtual machine base image, a virtual desktop, and an application hosted by the virtual machine.

3. The method of claim 1, further comprising:
storing the previous result of the query in a cache for subsequent comparison with the new result of the query.

4. The method of claim 1, wherein the query is one of a plurality of registered queries, each registered query to provide the up-to-date information at the client.

5. The method of claim 4, further comprising:
storing a list of the registered queries at the control server.

6. The method of claim 5, wherein each registered query is associated with reporting event data that specifies what change in the new query result is intended to generate a reporting event.

7. The method of claim 1, further comprising:
receiving, from the client, a user request to run the query.

8. A non-transitory computer readable storage medium including instructions that, when executed by a processing device, cause the processing device to perform a method comprising:
executing, by a host controller server, a query pertaining to at least one virtual machine of a plurality of virtual machines running on a plurality of host computers in a virtual machine system, a query being associated with reporting event data concerning the at least one virtual machine, the virtual machine system comprising the host controller server coupled to the plurality of host computers via a network;
providing, by the host controller server, a result of the query to a client of a plurality of clients via the network for presentation to a user in a graphical user interface (GUI);
periodically re-executing, by the host controller server, the query to obtain up-to-date information for the at least one virtual machine in the virtual machine system;
upon each re-execution of the query, comparing, by the processing device of the host controller server, a new result of the query with a previous result of the query to determine whether the up-to-date information for the at least one virtual machine in the virtual machine system has changed, wherein the virtual machine system comprises the plurality of clients coupled to the plurality of host computers and the host controller server via the network;
if the up-to-date information for the at least one virtual machine in the virtual machine system has changed, determining, based on the reporting event data, whether a change in the up-to-date information corresponds to a type of change intended to generate a reporting event;
providing, by the host controller server, the new result of the query to the client via the network for presentation to the user in the GUI if the up-to-date information for the at least one virtual machine in the virtual machine system has changed and the change in the up-to-date information corresponds to the type of change intended to generate a reporting event; and
refraining from providing the new result of the query to the client if the up-to-date information for the at least one virtual machine in the virtual machine system has not changed or the change in the up-to-date information does not correspond to the type of change intended to generate a reporting event.

9. The computer readable storage medium of claim 8, wherein the query pertaining the at least one virtual machine is a query about any one of a virtual machine, a host computer executing the virtual machine t, a virtual machine user, a virtual machine base image, a virtual desktop, and an application hosted by the virtual machine.

10. The computer readable storage medium of claim 8, wherein the method further comprises:
storing the previous result of the query in a cache for subsequent comparison with the new result of the query.

11. The computer readable storage medium of claim 8, wherein the query is one of a plurality of registered queries, each registered query to provide the up-to-date information at the client.

12. The computer readable storage medium of claim 11, wherein the method further comprises:
storing a list of the registered queries at the control server.

13. The computer readable storage medium of claim 12, wherein each registered query is associated with reporting event data that specifies what change in the new query result is intended to generate a reporting event.

14. A host controller server system comprising:
a memory to store a list of queries pertaining to a plurality of virtual machines running on a plurality of host computers in a virtual machine system, the plurality of host computers coupled to the host controller server system via a network; and
a processor, coupled to the memory, to:
execute a query pertaining to at least one virtual machine in the virtual machine system,
provide a result of the query to a client of a plurality of clients via the network for presentation to a user in a graphical user interface (GUI);
periodically re-execute the query to obtain up-to-date information for the at least one virtual machine in the virtual machine system;
upon each re-execution of the query, compare a new result of the query with a previous result of the query to determine whether the up-to-date information for the at least one virtual machine in the virtual machine system has changed, wherein the virtual machine system comprises the plurality of clients coupled to the plurality of host computers and the host controller server via the network;
if the up-to-date information for the at least one virtual machine in the virtual machine system has changed, determine, based on the reporting event data, whether a change in the up-to-date information corresponds to a type of change intended to generate a reporting event;
provide the new result of the query to the client via the network for presentation to the user in the GUI if the up-to-date information for the at least one virtual machine in the virtual machine system has changed and the change in the up-to-date information corresponds to the type of change intended to generate a reporting event; and
refrain from providing the new result of the query to the client if the up-to-date information for the at least one virtual machine in the virtual machine system has not changed or the change in the up-to-date information does not correspond to the type of change intended to generate a reporting event.

15. The system of claim 14, wherein the query pertaining the at least one virtual machine is a query about any one of a virtual machine, a host computer executing the virtual machine t, a virtual machine user, a virtual machine base image, a virtual desktop, and an application hosted by the virtual machine.

16. The system of claim 14, further comprising:
a cache to store the previous result of the query for subsequent comparison with the new result of the query.

17. The system of claim 14, wherein each query is associated with reporting result data that specifies what change in the new query result is intended to generate a reporting event.

18. The method of claim 1 wherein the GUI comprises a first area to present the new result of the query, a second area to present a plurality of actions to be performed with respect to the at least one virtual machine in response to the change in the up-to-date information, and a third area to present detailed information about the at least one virtual machine.

* * * * *